Feb. 23, 1932.    L. P. A. RIEGER    1,846,277
TRANSMISSION UNIT
Filed July 20, 1929
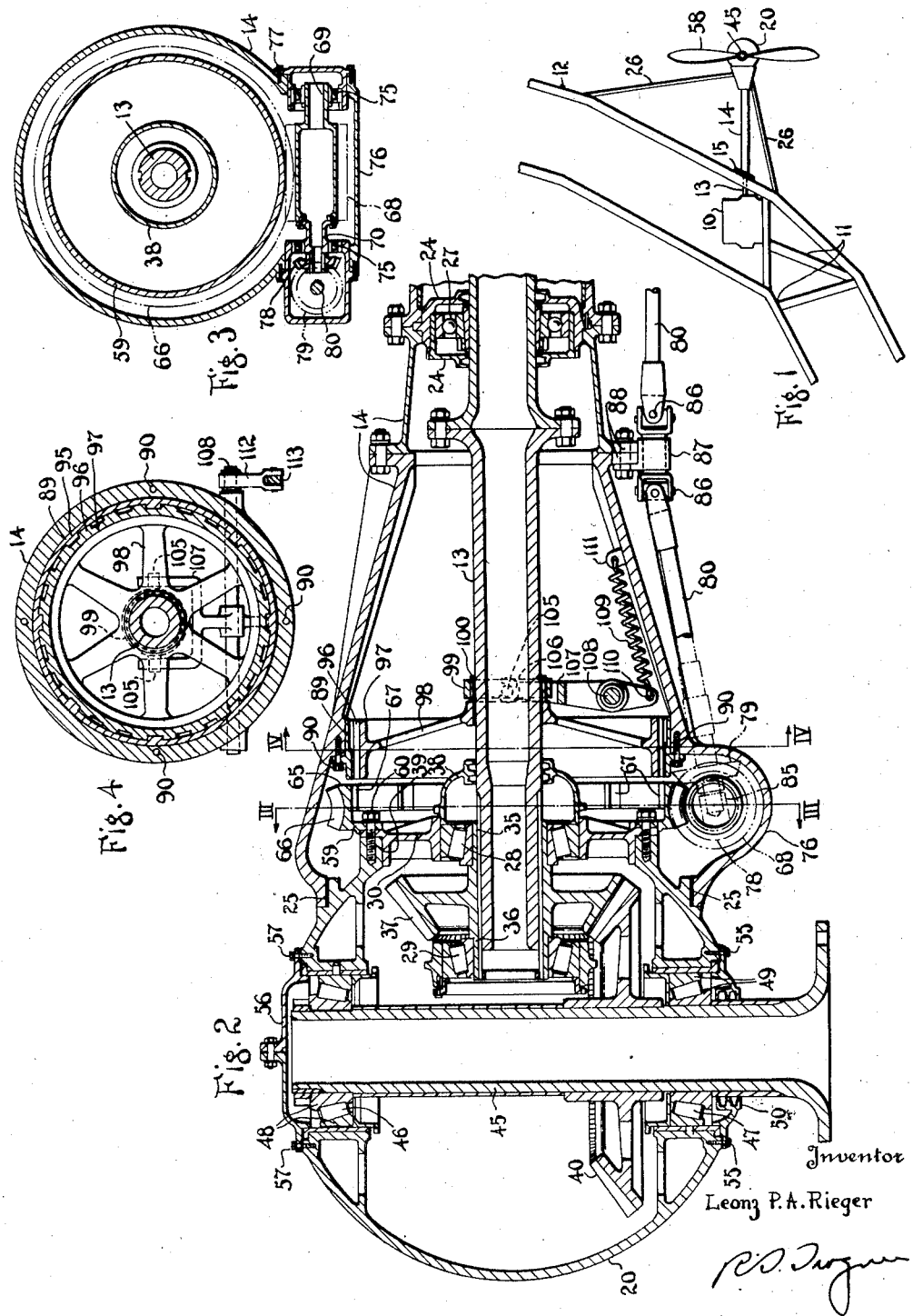
Inventor
Leonz P. A. Rieger
Attorney Patented Feb. 23, 1932

1,846,277

UNITED STATES PATENT OFFICE

LEONZ P. A. RIEGER, OF AKRON, OHIO, ASSIGNOR TO GOODYEAR-ZEPPELIN CORPORATION, OF AKRON, OHIO, A CORPORATION OF DELAWARE

TRANSMISSION UNIT

Application filed July 20, 1929. Serial No. 379,743.

This invention relates to transmission units including a plurality of shafts, and it has particular relation to constructions that provide operation of the several shafts in various angular or axial positions.

One object of the invention is to provide an interlocking device between relatively movable bearing supports for a plurality of shafts having their axes angularly disposed and adjustable.

Another object of the invention is to provide a construction in which relatively movable bearing supports for transmission shafts can be actuated to various relative positions and locked without imposing strains upon the actuating mechanism after the elements have been locked.

This invention is particularly directed to transmission units employed in driving propellers of aircraft, although it is adapted to be utilized in other constructions in which transmission shafts are similarly arranged. In both dirigible lighter-than-aircraft and airplanes, means have been provided for tilting the propellers or propeller shafts for the purpose of utilizing the propeller as a steering and lifting medium. Certain types of so-called self-arresting gearings were employed to tilt the propeller about angles ranging from 0° to 360°. Owing to the vibration caused by the motors, and the fact that the turning and tilting moments were concentrated directly upon the tilting gearing, it was practically impossible to secure the propeller shaft in an axially fixed position. The gearing had a relatively small contact area upon the propeller mechanism, and rapid wear of the parts thereof, as well as excessive noise, resulted.

This invention obviates excessive wearing upon the gearings and positively locks the tilting mechanism in various positions in such manner that in each position the gearing is entirely inactive. Interlocking devices are provided around the driving shaft of the transmission mechanism which lock the tiltable mechanism and the driving shaft housing directly.

For a better understanding of the invention, reference may now be had to the accompanying drawings, forming a part of the specification, of which;

Figure 1 is a fragmentary diagrammatical view of a power unit installed in the hull of an airship;

Figure 2 is a longitudinal sectional view of the transmission and propeller shafts of the power unit;

Figure 3 is a cross-sectional view, taken substantially along the line III—III of Figure 2; and Figure 4 is a cross-sectional view, taken substantially along the line IV—IV of Figure 2.

Referring to Figure 1, a motor 10 is mounted upon a framework 11 of an airship hull 12. A driving shaft 13 of the motor extends through the side of the airship hull, and is provided with a stationary bearing housing 14. One end of the housing is rigidly secured, as indicated at 15, to the airship hull, while its other end rotatably supports a propeller shaft housing 20 upon bearings 25. Bracing struts 26 are connected to the outer end portion of the housing 14 and to the airship hull.

As best shown by Figures 2 to 4, the housing 14 is provided with a protective packing housing 24 and ball bearings 27 within which the shaft 13 rotates. Roller bearings 28 and 29 supported in a rigid web 30 and in the housing 20 surround the shaft 13, and are disposed about oppositely disposed cylindrical portions 35 and 36 of a bevel gear 37 that is rigidly secured adjacent the outer end of the shaft 13. A conventional packing ring 38, secured within an opening 39 of the web, surrounds the shaft 13 adjacent the bearings 28. It will be observed that the axes of the roller bearings 28 and 29 converge outwardly from the shaft 13 toward one another. These bearings thus arranged absorb thrust forces of the housing 20 axially of the shaft 13 in both directions, as well as forces directed transversely thereof.

A bevel gear 40, rigidly secured to a propeller shaft 45, meshes with the bevel gear 37. Roller bearings 46 and 47, having their axes disposed obliquely with respect to the propeller shaft and to one another, are mounted in bearing supports 48 and 49 that are secured in opposite sides of the housing 20. A conventional packing ring 50 is secured to the housing adjacent the bearing 47 by means of suitable connections 55. Also, a cap 56 removably secured, as indicated at 57, to the housing 20 at a location opposite the packing ring 50, facilitates removal and installation of the propeller shaft. A propeller 58 is rigidly secured to the end of the shaft 45.

An annular member 59, rigidly secured, as indicated at 60, to the propeller housing 20, is arranged in coaxial relation about the shaft 13. The outer circumferential portion of the annular member is provided with an axially disposed integral flange 65, the outer circumferential portion of which is in the form of a worm gear 66, while the inner circumferential portion is provided with splines 67. A worm 68, having axial supports 69 and 70, meshes with the worm gear 66, and is mounted in bearings 75 of a housing 76 that is rigidly secured, as indicated at 77, upon the stationary housing 14. For the sake of convenience the worm 68 is shown diagrammatically. One end portion of the axial support 70 is provided with a bevel gear 78, rigidly secured thereto, which meshes with a similar bevel gear 79, rigidly secured to a rotatably driven sectional shaft 80. One end portion of the sectional shaft is mounted in bearings 85 provided in the housing 76 adjacent the bevel gear 79, while an intermediate portion is provided with universal joints 86 and is mounted in a bearing bracket 87 that is secured to flanges 88 of the housing 14. By rotating the shaft 80, the worm drives the annular member 59 and consequent rotation of the propeller shaft housing 20 is effected. By this operation, it is apparent that the propeller shaft is tiltable in a plane disposed transversely of the axis of the driven shaft 13.

A ring 89, disposed coaxially of the shaft 13, is rigidly mounted within the housing 14 by means of suitable connections 90. This ring is disposed adjacent the annular member 59 and it is provided with circumferentially arranged splines 95 that are axially aligned with the splines 67 of the annular member 59. Similar splines 96 circumferentially arranged upon an annular portion 97 of a spider 98 intermesh with the splines 95 of the ring, and the spider is slidably and rotatably mounted coaxially upon the shaft 13. In order to actuate the spider 98, a collar 99 secured to a cylindrical portion 100 thereof is provided with trunnions 105 which engages recesses or notches 106 of a lever 107. An intermediate portion of the lever is rigidly secured to a shaft 108 rotatably supported in the housing 14, and the lower end portion of the lever is provided with a spring 109 secured thereto, as indicated at 110, and to a suitable connection 111 mounted upon the housing 14. A crank arm 112 is rigidly secured to one end of the shaft 108, and is pivoted to an actuating rod 113, operable from the airship hull, to provide means in conjunction with the lever 107 for actuating the spider 98 along the shaft 13.

By moving the spider 98 axially toward the annular member 59, the splines 96 intermesh with the splines 67, while they are likewise intermeshing with the splines 95, thereby providing a clutch for positively locking the housings 14 and 20 against relative movement. After the worm 68 has been actuated to tilt the propeller shaft 45 into a desired position, the spider 98 is operated as described. Then the forces which otherwise would be transmitted by operation of the shafts 13 and 45 to the worm gear 66, worm 68 and the other elements thereof, are transmitted directly between the interlocked housings 14 and 20.

From the foregoing description, it will be apparent that the propeller tilting and locking or clutch mechanism provides for efficient, noiseless and positive operation of all of the elements thereof, without imposing excessive strains upon such mechanism.

Although I have illustrated only one form which the invention may assume and have described that form in detail, it will be apparent to those skilled in the art that the invention is not so limited, but that various modifications may be made herein without departing from the spirit of the invention or from the scope of the appended claims.

What I claim is:

1. A transmission unit comprising a driven shaft, a second shaft connected thereto, means including a worm and worm gear for tilting the second shaft, and means independent of the first means adapted to engage the worm gear for locking the second shaft in tilted position.

2. A transmission unit comprising a driven shaft, a second shaft disposed at an angle thereto, means operatively connecting the shafts, means for tilting the second shaft angularly of the driven shaft, and a clutch slidably carried on the driven shaft for locking the second shaft in the tilted position.

3. A transmission unit comprising a driven shaft, a stationary bearing support for the shaft, a second shaft, a bearing support for the second shaft movably mounted upon the stationary support, a mechanism for actuating the movable support upon the stationary support including a worm gear secured to the movable support and a worm journaled on the stationary support, and a clutch element slidably mounted on the stationary support and movable into engagement with the worm gear to positively lock the movable support in various positions.

4. A transmission unit comprising a driven shaft, a stationary bearing support for the shaft, a second shaft, a bearing support for the second shaft rotatably mounted upon the stationary support, mechanism for rotatably driving the rotatably mounted support, locking elements disposed upon contiguous portions of the two supports, and means normally engaging the locking elements of one of the supports and movable into locking engagement with the other support.

5. A transmission unit comprising a driven shaft, a stationary bearing support for the shaft, a second shaft, a bearing support for the second shaft rotatably mounted upon the stationary support, driving connections between the shafts, a gear element rigid with the rotatable bearing support, the axis of the gear element and the driven shaft coinciding, gear mechanism engaging the gear element for rotating the rotatable support, and an arcuate clutch axially mounted with respect to the driven shaft, said clutch having elements for interlocking the two bearing supports.

6. A transmission unit comprising a driven shaft, a stationary bearing support for the shaft, a second shaft, a second bearing support rotatably mounted upon the stationary support for supporting the second shaft, driving connections between the shafts, a gear surrounding the axis of the driven shaft, means rigidly securing the gear to the rotatable support, driving means engaging the gear for rotating the rotatable support, said gear having an arcuate portion disposed coaxially with respect to the driven shaft, and means slidably mounted upon the driven shaft for locking the two supports in various positions.

7. A transmission unit comprising a driven shaft, a stationary bearing housing for the shaft, a second shaft, a bearing housing for the second shaft rotatably mounted upon the stationary housing, driving connections between the shafts, an annular member rigidly secured to the rotatable housing in coaxial relation to the driven shaft, a mechanism engaging the annular member for rotating the rotatable housing, said housings having contiguous clutch elements arranged radially of the driven shaft and means for interlocking the clutch elements.

8. A transmission unit comprising a driven shaft, a stationary bearing housing for the shaft, a second shaft, a bearing housing for supporting the second shaft rotatably mounted upon the stationary housing, driving connections between the shafts, an annular member rigidly secured to the rotatable housing in coaxial relation to the driven shaft, a mechanism engaging the annular member for rotating the rotatable housing, said housings having contiguous clutch elements arranged radially of the driven shaft, and a spider disposed coaxially of the driven shaft for engaging the clutch elements to lock the housings in various positions.

9. A transmission unit comprising a driven shaft, a stationary bearing housing for supporting the shaft, a second shaft, a bearing housing for supporting the second shaft rotatably mounted upon the stationary housing, driving connections between the shafts, an annular gear rigidly secured to the rotatable housing in coaxial relation to the driven shaft, a mechanism engaging the annular gear for rotating the rotatable housing, said housings having contiguous clutch elements arranged radially of the driven shaft, a spider slidably mounted upon the driven shaft for engaging the clutch elements to lock the housings in various positions, and means resiliently urging the spider axially of the driven shaft.

10. In an aircraft, a propeller-controlling mechanism comprising a shaft support projecting outwardly from the aircraft, a driven shaft carried by the support, a propeller shaft carrier movably mounted upon the support, a propeller shaft rotatably supported by the carrier, driving connections between said shafts, worm and worm gear mechanism for moving the carrier with respect to the shaft support and normally serving to lock the carrier in the adjusted position, and an additional positive locking device for securing the support and carrier directly together for relieving said worm mechanism of all strains.

In witness whereof, I have hereunto signed my name.

Signed at Akron, in the county of Summit and State of Ohio, U. S. A., this 19th day of July, 1929.

LEONZ P. A. RIEGER.